United States Patent Office 2,724,011
Patented Nov. 15, 1955

2,724,011

STORAGE BATTERY SEPARATOR AND METHOD OF PRODUCTION

Howard J. Strauss, Elkins Park, Pa., assignor to The Electric Storage Battery Company, a corporation of New Jersey No Drawing. Application December 3, 1951,
Serial No. 259,703

12 Claims. (Cl. 136—146)

The invention relates to separators for use between secondary or storage battery plates of different polarity.

In a separator for a conventional type lead-acid storage battery, a chief requisite is a high degree of porosity to permit maximum diffusion of the electrolyte together with ease of ionic transfer of electrolyte ions from one plate to the other to minimize internal resistance within the cell. The size of the individual pores, however, is desirably such as to prevent actual physical passage therethrough of metal ions or metal molecules, particularly in that type of secondary battery in which the positive and negative active materials are formed respectively from two different metals. Optimum porosity is determined by these factors modified by the fact that the separator must have a certain minimum mechanical strength to withstand handling during assembly of the battery, to maintain its shape when wet, and to prevent piercing thereof by growth of active material which might result in short circuits.

For example, United States Patent No. 2,317,711 issued to Henri G. Andre discloses a secondary battery wherein the positive active material is silver oxide ($Ag_2O$) or silver peroxide ($Ag_2O_2$), or a combination thereof, and the negative active material is zinc. In such a couple, if silver ions were to be permitted to pass through the pores of the separator and become deposited on the negative electrode, local action would be set up whereby self discharge would result in premature exhaustion of the battery. The aforementioned United States patent has disclosed that silver positive plate can conveniently be wrapped in a cellulosic diaphragm to isolate the positive active material from the negative plate.

It has been determined that although such a cellulosic material is eminently satisfactory to prevent actual transfer of the metal ions, it is relatively poor in mechanical strength when used in sheets thin enough to afford the desired minimum internal resistance in the battery and can readily be pierced by growth or "treeing" of the negative active material.

It is, therefore, an object of the present invention to provide a separator, and a method of production thereof, which will be of optimum porosity, low in internal resistance, and yet contain pores of such a size as to mechanically screen the metallic ions from the active material thereby preventing their passage from a plate of one polarity to another of opposite polarity. Another object of the invention is to provide a separator that will have sufficient mechanical strength to prevent ready penetration thereof by growth of active material.

It is a further object of the invention to provide a separator of the type described above that is highly resistant to strongly acidic, basic, or oxidizing environments.

Other objects of the invention will be apparent from the description and claims that follow.

In the practice of the invention there is utilized a microporous matrix, preferably of a thermoplastic synthetic resin, which may advantageously be produced, in the manner disclosed in United States Patent No. 2,542,527—Honey et al., from polyvinyl chloride, polystyrene, polyethylene, or any other material resistant to strong acids, bases or oxidizing media. In said patent there is set forth a method of producing microporous separators by mixing a thermoplastic resin and starch particles. The mix is formed into a desired shape, as by extrusion, and treated with hot water to swell the starch particles. While in the swollen state, the starch is removed by treatment with hot acid and the shaped mass then shrinks to approximately its original dimensions, following which it is washed to remove the acid, and dried.

By this process, particularly where the mix is shaped by extrusion, there can be produced a microporous separator of extreme thinness, in the nature of from about .002 inch to about .007 inch, such thinness being of extreme importance insofar as decreased internal cell resistance is concerned. The pore sizes of this separator, even though microscopic, are such as to pass certain metallic ions, for example silver ions therethrough when used in storage battery.

In the process of the invention, the microporous matrix produced in accordance with United States Patent No. 2,542,527 in tubular form, or as flat or ribbed sheet, is impregnated with a solution of a cellulosic base filler material and the filler deposited within the micropores of the matrix. Since the cellulosic material is, in itself porous with the pores being what might be termed sub-microporous in size, there is produced a microporous separator the pores of which contain a porous filler of even smaller pore size. The pores of the cellulosic material are of such size as actually to prevent, by selective mechanical screening, the passage therethrough of all ions larger in size than electrolytic ions.

Preferably, there is used as a base material for the impregnant, a cellulosic material that, conveniently, may be in the form of cotton linters. These linters are steeped in an aqueous solution of 3% NaOH for from about five hours to about ten hours in an atmosphere of steam to convert the linters to alkali cellulose in accordance with the following reaction:

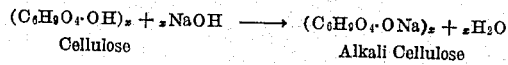

$$(C_6H_9O_4 \cdot OH)_x + _xNaOH \longrightarrow (C_6H_9O_4 \cdot ONa)_x + _xH_2O$$
Cellulose                                           Alkali Cellulose The alkali cellulose is then dried at a temperature of from about 100° C. to 110° C. for a short period of time, in the nature of about two hours, and further treated with carbon disulfide to produce a heavy, viscous cellulose xanthate solution which is then used to impregnate the microporous thermoplastic matrix. The reaction of alkali cellulose and carbon disulfide is as follows:

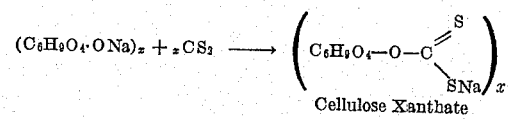

$$(C_6H_9O_4 \cdot ONa)_x + _xCS_2 \longrightarrow \left(C_6H_9O_4{-}O{-}C\begin{matrix}\diagup S \\ \diagdown SNa\end{matrix}\right)_x$$
Cellulose Xanthate The microporous matrix is then dipped into the cellulose xanthate solution and the latter is permitted to permeate the micropores thereof until a condition of complete saturation is reached after which the matrix is removed from the solution. A treatment with a 4%–5% solution of sulfuric acid will then regenerate the cellulose within the matrix.

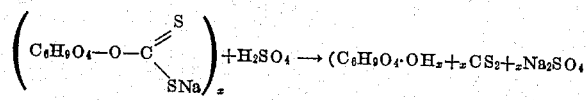

$$\left(C_6H_9O_4{-}O{-}C\begin{matrix}\diagup S \\ \diagdown SNa\end{matrix}\right)_x + H_2SO_4 \longrightarrow (C_6H_9O_4 \cdot OH_x + _xCS_2 + _xNa_2SO_4)$$

After such treatment the matrix is immersed in a weak basic solution, such as 3% NaOH to neutralize the acid and, after washing and drying, it is ready for insertion into the battery.

If it is desired for production purposes to eliminate the acid treatment step that is required in the regeneration phase of the foregoing process, as well as treatment with NaOH, the impregnating solution can be prepared as follows:

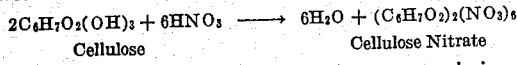

It will be understood that the nitration process is incomplete in order that the nitrate of cellulose known as "pyroxylin" is produced. This product is then dissolved in a mixture of ether and alcohol to form a collodion solution with which the microporous matrix is then impregnated. After complete impregnation, a simple drying operation to remove the solvent is the only step necessary to prepare the separator for actual use.

The examples here given and the particular description set forth are merely presented in order to illustrate how the invention may be applied. Other forms of the product and variations in the process coming within the scope of the appended claims will readily suggest themselves to those skilled in the art.

I claim:

1. A storage battery separator comprising a microporous synthetic resin matrix, and a cellulosic filler material deposited in the pores thereof.

2. The separator of claim 1 in which the cellulosic filler material is selected from the group consisting of cellulose and cellulose nitrate.

3. The separator of claim 1 in which the filler material consists of cellulose.

4. The separator of claim 1 in which the filler material consists of cellulose nitrate.

5. The separator of claim 1 in which the microporous synthetic resin matrix is selected from the group consisting of polyvinyl chloride, polystyrene and polyethylene.

6. A method of producing a storage battery separator comprising the steps of impregnating a microporous synthetic resin matrix with a solution of a cellulosic filler material, and precipitating a microporous cellulosic filler material from said solution within the pores of said matrix.

7. The method of claim 6 wherein the cellulosic solution is selected from the group consisting of xanthate solutions and collodion solutions and the cellulosic material is selected from the group consisting of cellulose and cellulose nitrate.

8. In a method of producing a storage battery separator, the steps of impregnating a microporous thermoplastic synthetic resin matrix with a cellulose xanthate solution, regenerating cellulose within the pores of said matrix, and washing and drying said matrix.

9. In a method of producing a storage battery separator the steps of impregnating a microporous thermoplastic synthetic resin matrix with a cellulose xanthate solution, treating said matrix with sulphuric acid to regenerate cellulose within the pores thereof, and washing and drying said matrix.

10. In a method of producing a storage battery separator, the steps of impregnating a microporous thermoplastic synthetic resin matrix with a collodion solution and drying the matrix to precipitate cellulose nitrate within the pores of said matrix.

11. The method of producing microporous material which comprises solubilizing cellulose to form a solution, impregnating a microporous thermoplastic synthetic resin matrix with said solution, and regenerating cellulose within the pores of said matrix.

12. The method of producing microporous material which comprises solubilizing cellulose to form a cellulose xanthate solution, impregnating a microporous thermoplastic synthetic resin matrix with said solution, regenerating the cellulose within the micropores of said matrix, and washing and drying said matrix.

References Cited in the file of this patent

UNITED STATES PATENTS

| | | |
|---|---|---|
| 1,393,467 | Thatcher | Oct. 11, 1921 |
| 1,463,864 | Bent | Aug. 7, 1923 |
| 1,500,220 | Benner | July 8, 1924 |
| 1,514,548 | Lione | Nov. 4, 1924 |
| 1,977,221 | Yates | Oct. 16, 1934 |
| 2,077,412 | Herzog | Apr. 20, 1937 |
| 2,478,186 | Gerber | Aug. 9, 1949 |
| 2,542,527 | Honey et al. | Feb. 20, 1951 |
| 2,543,137 | Uber | Feb. 27, 1951 |